INVENTOR.
FRED STERZER
BY
Milton S. Winters
ATTORNEY

INFORMATION HANDLING DEVICES

Filed Jan. 20, 1959

2 Sheets-Sheet 2

INVENTOR.
FRED STERZER
BY Milton S. Winters
ATTORNEY

United States Patent Office 2,999,167
Patented Sept. 5, 1961

2,999,167

INFORMATION HANDLING DEVICES

Fred Sterzer, Monmouth Junction, N.J., assignor to Radio Corporation of America, a corporation of Delaware Filed Jan. 20, 1959, Ser. No. 787,878
12 Claims. (Cl. 307—88)

This invention relates to information handling devices, and more particularly to circuits having more than one stable state of operation.

Multistable state circuits are used extensively in information handling systems and computers for storing information counting, and the like. A bistable multivibrator, for example, may be adapted to store a binary "one" when it is in one of its stable states, and to store a binary "zero" when it is in its other stable state. Such a circuit may be arranged as a scale-of-two, or single stage binary counter; several such stages may be combined to form a several-digit binary counter.

It is desirable in information handling systems and computers that the systems operate at high speed. Accordingly, it is desirable that the various circuits be of high speed both in response and recovery time. It is also desirable that the circuits be reliable in operation and have low power requirements. The present invention provides a circuit having more than one stable state and having a parametric oscillator as its principal component. Oscillators of this type are capable of operating in the microwave region, generally have low power requirements, and may be operated at very high speed.

It is an object of the present invention to provide an improved multistable state circuit.

It is another object of the present invention to provide a high speed multistable state circuit.

It is still another object of the present invention to provide a reliable multistable state circuit which has low power requirements.

It is a further object of the present invention to provide a high speed, multistable state circuit having a parameter oscillator as a principal component thereof.

Yet another object of the present invention is to provide an improved scaling circuit.

According to the present invention, a portion of the parametric oscillator output is delayed, by suitable means, for a selected time interval and fed back to the oscillator as a locking signal. The delay is adjusted so that, for example, if the oscillator frequency is equal to one-half the pump signal frequency, the total delay interval is close to $$\frac{n}{2}T$$

where $n$ is an odd integer, and T is the period of the parametric oscillations. That is to say, the parametric oscillator sees a locking signal which appears to be close to 180° out of phase with the parametric oscillations in the oscillator. The state of the oscillator, as represented by the phase of the oscillator output, is switched by causing the amplitude of the parametric oscillations to decay momentarily below the amplitude of the locking signal. This may be accomplished, for example, by applying a D.C. (direct current) pulse to the variable reactance element of the oscillator, or by interrupting the pump signal. When oscillations resume, as by terminating the D.C. pulse, the oscillations build up 180° out of phase with the previous oscillations because of the action of the locking signal. Such a circuit functions as a bistable circuit triggerable by the D.C. pulse, or by the interruption of the pump oscillations, as the case may be.

The foregoing and other objects, advantages, and novel features of this invention, as well as the invention itself both as to its organization and mode of operation will be more fully apparent from the following description when read in connection with the accompanying drawing, in which like reference numerals refer to like parts, and in which.

The basic idea of a parametric oscillator stems from Mathieu's equation. In general, any circuit or device whose resonant frequency is changed at one of certain prescribed rates may be caused to oscillate. A parametric oscillator consists essentially of a tank circuit having an element of variable reactance. When, for example, the variable reactance element is a voltage-sensitive, variable-capacitance diode, the resonant frequency of the circuit depends upon the amplitudes of the A.C. (alternating current) and D.C. voltages across the diode, and the resonant frequency may be varied by applying an alternating pump signal to the circuit. When the "natural" frequency of the circuit lies close to a frequency at which parametric oscillations can be sustained by a signal at the pump frequency, the circuit may be driven into parametric oscillation by adjusting the amplitude of the pump signal to change the apparent reactance of the variable element an amount sufficient to tune the circuit to that frequency at which parametric oscillations may be sustained. A large output is obtained at that frequency. The sustained frequency, as is known, is one of certain permissible frequencies related in a simple manner to the pump frequency. The "natural" frequency may be defined as the small signal resonant frequency of the tank circuit.

By way of example, the oscillations may be sustained at a frequency one-half that of the pump signal frequency. Assume that the parameters of the tank circuit are adjusted in known fashion so that the natural frequency $f_o$ lies close to one-half the pump frequency $f_p$. When the amplitude of the pump signal exceeds a critical value, the tank circuit is driven into parametric oscillation at a frequency $f_{osc}=f_p/2$, which is nearly equal to $f_o$ because of the action of the pump signal on the variable reactance element. Two possible stable phase outputs may be obtained from the oscillator. These outputs are of equal amplitude but differ in phase by 180°. Which output is obtained will be determined by conditions existing in the tank circuit at the time oscillations commence. The circuit may be steered into one phase or the other by applying to the circuit a small signal of frequency $f_p/2$ during the time oscillations are starting to build up. This signal is commonly referred to as a "locking signal." The oscillations lock in at that one of the possible stable phases (two in the instant example) which is closest to the phase of the locking signal.

Figure 1:
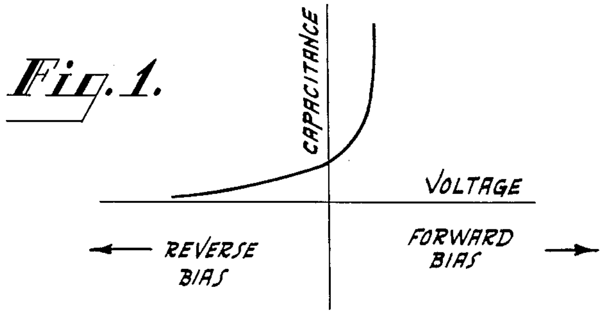
FIGURE 1 is a graph illustrating the relationship of capacitance to applied voltage for one type of voltage-sensitive, variable-capacitance diode.

A semiconductor diode can serve as the active element in a parametric oscillator because its capacitance is a function of the effective voltage across its terminals, and this voltage may be varied in accordance with the pump signal. The capacitance versus voltage characteristic on one type of semiconductor diode is illustrated graphically in FIGURE 1. Parametric oscillators, as is known, may also comprise other variable reactance elements, such as ferrite cores, iron core transformers, etc.

Figure 2:
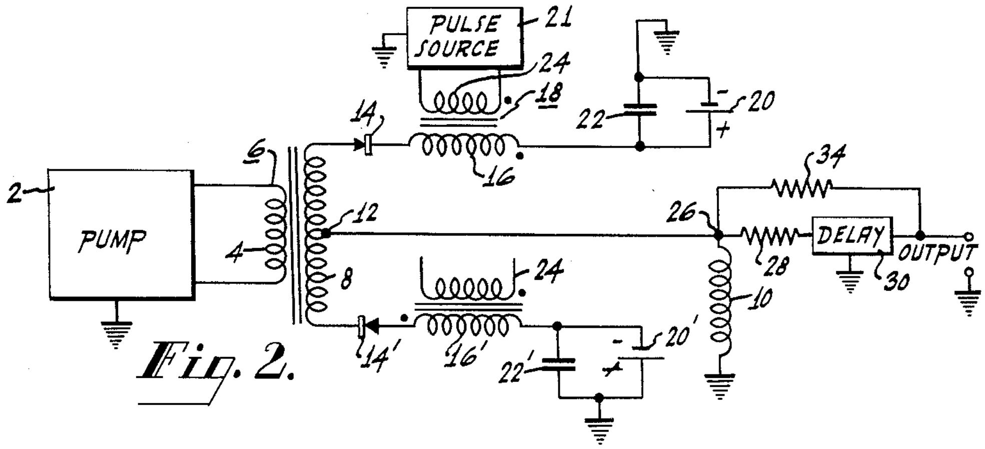
FIGURE 2 is a circuit diagram of a multistable state circuit according to the present invention.

FIGURE 2 illustrates one embodiment of a multistable state circuit according to the present invention. The parametric oscillator shown is of the so-called lumped constant type. The output of a local oscillator, or pump 2, is applied across the primary winding 4 of a signal input transformer 6. The secondary winding 8 of this transformer 6 is center tapped, and an inductor 10 is connected between the center tap 12 at a junction 26 and a point of reference potential, illustrated as circuit ground. The upper end terminal of the secondary winding 8 is connected to the anode of a variable-capacitance, voltage-sensitive diode 14. The cathode of the diode 14 is operatively connected through the secondary winding 16 of a pulse input transformer 18 to the positive terminal of a biasing source, illustrated as a battery 20. The negative terminal of the battery 20 is connected to reference ground. The battery is preferably of such value as to prevent the diode 14 from being forward biased in response to excursions of the alternating voltage from the pump 2. A capacitor 22 is connected across the battery 20 to provide a shunt path for high frequency transients.

The lower half of the signal input transformer 6 secondary winding 8 is connected in a resonant circuit which is structurally similar to that described above, and wherein corresponding components are designated by primes ('). It should be noted that the connections to the diode 14' and battery 20' of the lower resonant circuit are reversed by comparison with the connections to their counterparts 14, 20, respectively, in the upper resonant circuit. The windings 16, 16' may be secondary windings of the same pulse input transformer 18. A source 21 of pulses is coupled to the primary winding 24 of this transformer 18. The pulse source 21 may, for example, be any suitable source of substantially D.C. pulses. In general, the pulses may be positive going or negative going. The pulses respectively applied to the separate halves of the parametric oscillator should produce the same effect on the diodes 14, 14'. One of the secondary windings 16, 16' may be wound in the reverse direction to accomplish this end, as indicated by the conventional dots.

The output of the oscillator may be taken from across the inductor 10, as by connecting to the junction 26. A resistor 28 is connected between the junction 26 and the input of a delay device 30. The delay device may be, for example, a lumped-parameter delay line comprising inductances and capacitances, and the time delay of the delay device 30 is preferably adjustable. A resistor 34 is connected between the output of the delay device 30 and the junction 26 to provide a path for feeding back a portion of the delayed output to the parametric oscillator.

Assume for purposes of illustration that the parameters of the two resonant circuits are selected so that the natural frequency $f_o$ of each lies close to $f_p/2$, where $f_p$ is the frequency of the pump 2. When pump signals of the proper amplitude are initially applied to the resonant circuits, parametric oscillations build up therein and are sustained at a frequency $f_p/2$. The oscillations build up in either of two phases which are 180° apart, and which are fixed relative to the pump signal. The phase relationship of the pump signal to the two possible phases, indicated as phase A and phase B, of parametric oscillations is illustrated graphically in FIGURE 3. The relative amplitudes shown are illustrative only. The circuit of the instant example may be used as a bistable circuit wherein the two stable states are represented by the outputs "A" and "B," respectively.

Figure 3:
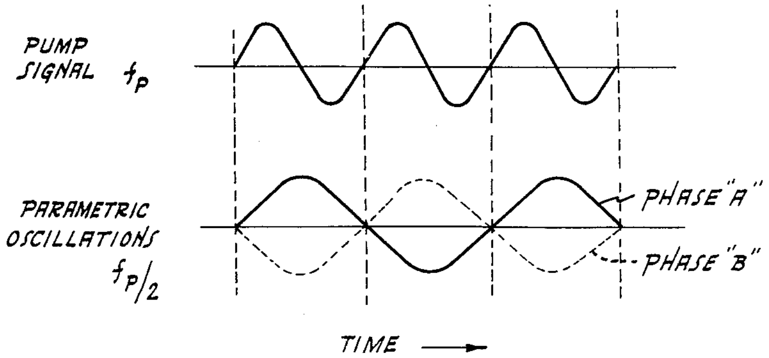
FIGURE 3 is a set of curves which illustrates the phase relationships of the two possible outputs of a bistable parametric oscillator to that of the pump signal when practicing the present invention.

Assume now that the output developed across the inductor 10 is represented by the signal designated phase "A" in FIGURE 3. This output is coupled to the input of the delay device 30 which delays the output for an interval of time. A portion of the delayed output is fed back to the oscillator by way of the feedback path comprising resistor 34. The delay is preferably adjusted so that the feedback signal developed across the inductor 10 is close to $n\pi$ radians out of phase with the oscillation signal developed across the inductor 10, where $n$ is an odd integer. In theory, the feedback signal may lie between $$n\pi-\frac{\pi}{2} \text{ and } n\pi+\frac{\pi}{2} \text{ radians}$$

out of phase with the oscillation output. However, the range is somewhat more critical in practice, and the feedback signal is preferably close to $n\pi$ radians out of phase to hold distortion to a minimum. The ideal feedback signal in this example may be represented by a signal which is in phase with the signal designated phase "B" in FIGURE 3, but of much lesser relative amplitude.

The parametric oscillator, or bistable circuit, may be switched from its one stable state represented by phase "A" output to its other stable state represented by phase "B" output by applying a voltage pulse momentarily to the resonant circuits. Such a pulse may be provided by the pulse source 21. The voltage pulse changes the capacitances of the resonant circuits so that the operating frequency of the resonant circuits lies outside the region in which parametric oscillations are sustained. Oscillations then tend to die out at a frequency which is different from the parametric oscillating frequency. The amplitude and polarity of the applied pulse are preferably of such nature as to drive the diodes 14, 14' into the forward conducting region because circuit losses cause the oscillations to die out rapidly when the diodes are forward biased. When the applied pulse is terminated, oscillations resume in a phase determined by conditions existing in the tank circuits at that time. If the amplitude of the locking signal is greater than the amplitude of the damped oscillations, the phase of the resumed oscillations is determined by the locking signal. In this case, the output phase will be switched by 180° to phase "B" because of the phase of the locking signal.

The bistable circuit may also be switched from one stable state to the other by interrupting the pump 2, or by interrupting the coupling between the pump 2 and the resonant circuits for an interval of time sufficient to allow the amplitude of the oscillations to decay below the amplitude of the locking signal. Since parametric oscillations are not sustained when the amplitude of the pump signal is less than a predetermined value, the bistable circuit may also be switched by momentarily lowering the amplitude of the pump signal below the aforesaid predetermined value. The method of switching wherein a voltage pulse is applied to the oscillator has the advantage that oscillations in the tank circuit are damped rapidly, and the bistable circuit may be switched at a faster rate. Although the parametric oscillator of FIGURE 2 is illustrated and described as comprising two resonant circuits, it will be apparent to one skilled in the art that only one resonant circuit is necessary. The particular configuration shown, however, has the advantage that signal components at the pump frequency tend to be cancelled out in the inductor 10 by action of the two resonant circuits.

If the triggerable bistable circuit described above is used in a system wherein a binary "one" is represented by R.F. signals of the parametric oscillator frequency and of phase "A," and a binary "zero" is represented by R.F. signals of the same frequency and in phase with phase "B," then the output from the delay device 30 may be used directly in such a system. If a binary "one" and a binary "zero" are respectively represented in the system by R.F. signals and the absence of R.F. signals of the parametric oscillator frequency, then the output of the delay device 30 may be applied to a phase comparator (not shown) together with a reference signal.

Figures 4, 5, 6, 7:
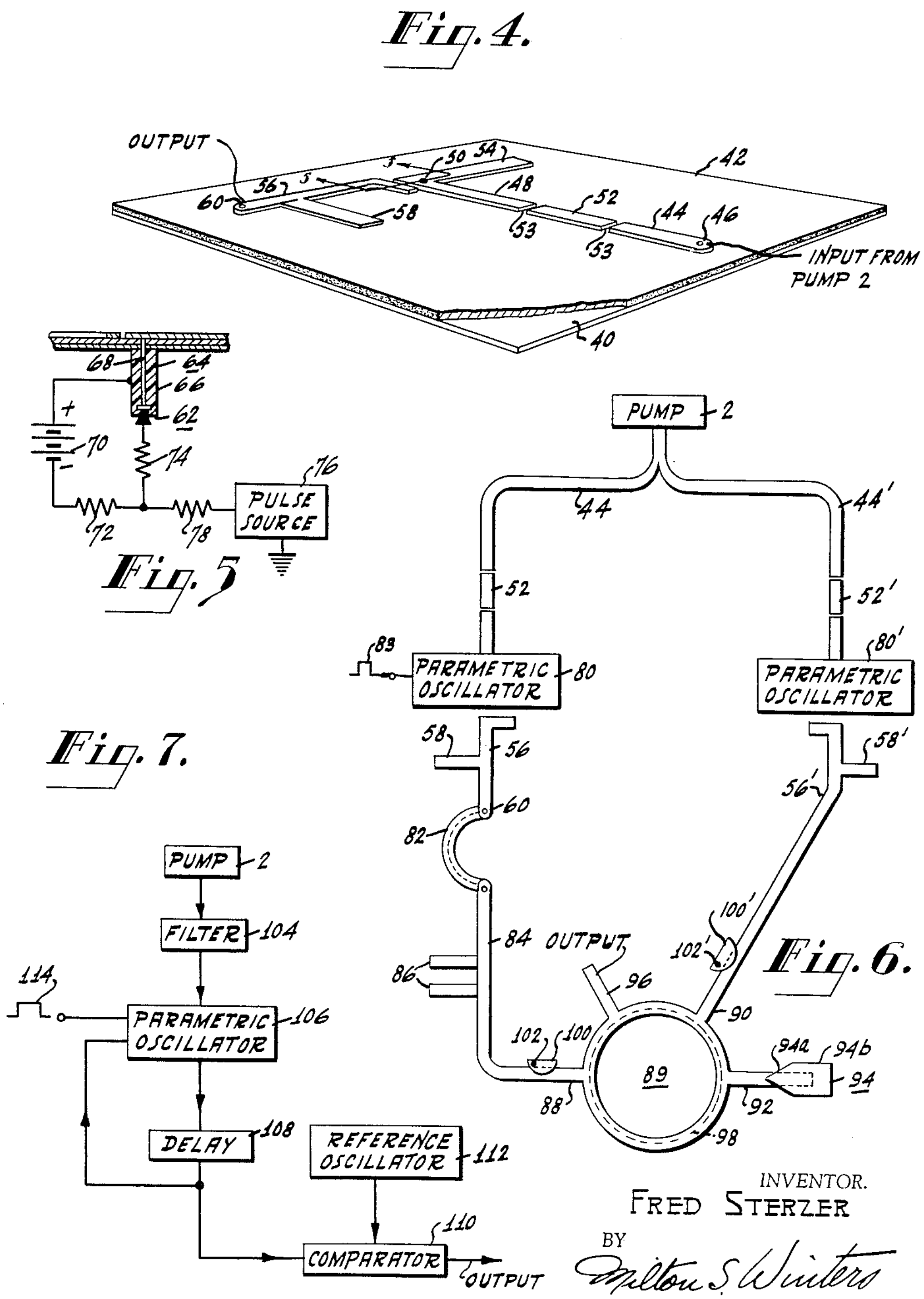
FIGURE 4 is a perspective view of a parametric oscillator constructed of strip transmission line and capable of very high frequency operation.
FIGURE 5 is a cross-sectional view of a detail of FIGURE 4 taken along the line 5—5 of FIGURE 4 and showing certain circuit components connected thereto.
FIGURE 6 is a schematic diagram showing, partly in block form and partly in plan view, a counter, or scaling circuit, according to the present invention.
FIGURE 7 is a schematic diagram in block form of another counter, or scaling circuit.

FIGURE 4 represents, in perspective, a parametric oscillator suitable for operation at very high frequencies. The components are of so-called strip transmission line construction. Such strip transmission lines may be constructed by employing a metal ground plate 40, which may be copper, applied as a backing on one surface of a suitable dielectric material 42. On the other surface of the dielectric 42 are strips of copper which may be established by printed circuit etching or plating techniques to form the desired circuit. A transmission line is formed between the strip copper and the spaced ground plate 40. The input from the pump 2 may be coupled to the section 44 of strip transmission line at a point 46 from another transmission line (not shown), such as a coaxial line, by means of a known type of transducer. A suitable transducer for this purpose is described in the copending application of Donald J. Blattner and Fred Sterzer, Serial No. 760,225, filed September 10, 1958, for "Logic Circuits" and assigned to the assignee of the present invention. As described in that copending application, these transducers preferably include an outer conductor connected to the ground plate 40 and an inner conductor which passes through an aperture in the ground plate to make connection with the strip transmission line as at the point 46.

The parametric oscillator circuit comprises the section 48 of strip transmission line and voltage-sensitive, variable-capacitance diode 62 mounted, for example, at the point 50 in the manner illustrated in FIGURE 5. The diode 62 and the section 48 of strip transmission line form a resonator. The parameters may be adjusted so that parametric oscillations are sustained at any one of the permissible frequencies, especially one-half the pump signal frequency. A section 52 of strip transmission line is inserted between the oscillator section 48 and the section 44 to which the pump signal is coupled. The section 52 may be provided, for example, by making cuts 53 in a unified section of strip transmission line. The section 52 is preferably one-half wavelength at the pump frequency and serves as a filter which passes the pump signal to the oscillator and prevents signals at the oscillator frequency from feeding back to the pump 2. Inasmuch as the circuit is physically open between the oscillator and the pump 2, it is necessary to provide a D.C. return from the parametric oscillator to reference ground. A section 54 of strip transmission line is provided for this purpose. The section 54 is approximately one-quarter wavelength electrically at the oscillator frequency, and the end furthest from the diode is connected to the ground plate 40.

The coupling for the output is in the form of a tapered section 56 of strip transmission line which tapers down to a very small fraction of the normal width of the strip conductor and approaches within perhaps 0.02 inch of the diode end of the resonator. Coupling may be decreased by shaving off part of the end of the coupling section 56, or increased by connecting a wire on the surface of the coupling section 56 to approach nearer the diode resonator. A filter is provided in the output section 56 to remove components of the pump signal from the output. Such a filter may be a stub 58 which is one-quarter wavelength electrically at the signal frequency and grounded at its outer end. Another suitable filter is a standard low pass coaxial filter which may be serially connected with the strip transmission line. A suitable transducer may be connected, for example, at the point 60 if it is desired to transmit the output over a transmission line other than strip transmission line. Such a transducer may be of the type described in the aforementioned copending application of Donald J. Blattner and Fred Sterzer.

FIGURE 5 illustrates the manner in which the diode 62 may be inserted in the circuit. A transducer 64 includes an outer conductor 66 connected to the ground plate 40 and an inner conductor 68 which passes through an aperture in the ground plate to make connection to the section 48 of strip transmission line. Suitable impedance matching may be provided. The transducer 64 may have a mounting at its termination for the variable capacitance diode 62. The diode 62 is preferably back-biased by a suitable biasing source, such as battery 70. The positive terminal of the battery 70 is connected to the ground plate 40. The negative terminal of the battery 70 is connected to the anode of the diode 62 through series resistors 72, 74. Connections to the diode 62 and battery 70 may be reversed if desired. The inner conductor 68 of the transducer 64 is connected to the cathode of the diode. A source 76 of pulses is provided for switching the phase of oscillations in the manner previously described. These pulses may be applied through a resistor 78 to the junction of resistors 72, 74. The pulses may also be applied in series with the diode.

A suitable means for providing a locking signal is illustrated in FIGURE 6 wherein corresponding components are designated by like reference numerals. A section 82 of coaxial line is connected to the output coupling section 56 at the point 60. The coaxial line 82 provides a time delay for the output signal in a known manner. The other end of the coaxial line 82 is connected to another section 84 of strip transmission line. A pair of tuning stubs 86 are provided on the latter section 84 for reflecting back to the oscillator a portion of the output signal. Standard coaxial tuning stubs may be used for this purpose if it is so desired. When the frequency of the parametric oscillator is one-half the pump frequency, the parameters of the coaxial line 82 and the total length of strip transmission line between the reflecting stubs 86 and the oscillator are selected so that the reflected signal applied to the oscillator is close to $n\pi$ radians out of phase with the oscillations in the parametric oscillator, $n$ being an odd integer.

The operation of the strip transmission line parametric oscillator of FIGURE 4 as a bistable circuit is similar to that of the lumped constant oscillator illustrated in FIGURE 2 and described previously. When it is desired to switch the output phase of the parametric oscillator (that is to say, when it is desired to switch the state of the bistable circuit), a pulse may be applied across the diode 62 from the pulse source 76. This pulse changes the operating parameters of the oscillating circuit so that parametric oscillations are not sustained. Provided that the amplitude of the damped oscillations decays below the level of the reflected locking signal, the phase of the resumed oscillations will be determined by the phase of the locking signal when the applied pulse is terminated. Since the reflected or fed back signal is delayed $$n\frac{\pi}{2} \text{ radians}$$

electrically, the output phase will be switched 180°.

A single tuning stub may be used in place of the pair of tuning stubs 86 to reflect a portion of the output signal. A portion of the output signal may also be reflected by providing a transverse cut in the section 84 of strip transmission line. Although the coaxial line 82 has been described as providing a suitable delay for the output signal, it will be understood that the invention is not meant to be limited to coaxial delay lines. Other delay means may be suitable depending upon the particular application. For example, a continuous section of strip transmission line may be used wherein the length between the oscillator and the reflecting means is adjusted so that the total time delay for the signal to travel from the oscillator to the reflecting means and back to the oscillator is close to $$\frac{n}{2}\pi$$

where T is the period at the parametric oscillating frequency and $n$ is an odd integer.

The parameters of the parametric oscillator may, alternatively, be selected so that the oscillator has more than two separate and distinguishable stable phase outputs. For example, if parametric oscillations are sustained at a frequency $f_p/n'$, and the oscillator may have $n'$ stable outputs. The shift in phase in response to an applied pulse will again be determined by the phase of the reflected locking signal, and will be cyclic in nature. That is to say, if the phases are designated 1, 2, 3 . . . $n'$, and if the first applied pulse shifts the operating state from phase "1" to phase "2," then the next applied pulse shifts the operating state from phase "2" to phase "3." In a similar manner, if the first pulse, because of the time delay in the reflected signal, shifts the operating state from phase "1" to phase "3," then the next applied pulse shifts the operating state from phase "3" to phase "5," etc. It is to be noted that this is precisely the characteristic of a counter, or scaling circuit. Thus, if the circuit is tri-stable, having phases "1," "2" and "3," and if the delay causes an electrical delay of 120°, then at each pulse, the circuit will progress by one phase, forward. If, however, the delay is 240°, at each pulse, the circuit states will, in effect, progress backwards, from state or phase "1" to "3," from "3" to "2," and from "2" to "1," at each pulse interruption. On selection of the appropriate delay, the circuit "counts" in either fashion.

FIGURE 6 is a plan view of a scaling, or counting, circuit embodying the strip transmission line parametric oscillator of FIGURE 4. The output of the pump 2 is transmitted over separate sections 44, 44' of strip transmission line to filters 52, 52' respectively. These filters allow signals at the pump frequency to pass, but block signals at the parametric oscillator frequency. Pump signals passing through the filters 52, 52' are applied to parametric oscillators 80, 80', respectively. The parametric oscillators 80, 80' are of the type illustrated in FIGURE 4 and described heretofore, and preferably are adjusted to oscillate parametrically at one-half the pump frequency. Pulses 83 may be applied intermittently to the left-hand parametric oscillator 80 as desired to cause oscillations in that oscillator to die out. The indicated polarity of pulse 83 is illustrative only. In the instant embodiment, no voltage pulses are applied to the right-hand parametric oscillator 80' for reasons which will be explained hereinafter.

The output from oscillator 80 is coupled by a section 56 of strip transmission line to a section of coaxial line 82 which serves to delay the output signals. Projecting stub 58 is a filter for components of the pump frequency. The other end of the coaxial line 82 is coupled by a transducer (not shown) to a section 84 of strip transmission line which transmits the delayed output of oscillator 80 to one input arm 88 of a comparator, such as a "magic T," or "rat-race" or other, equivalent hybrid circuit 89 for all of which the term "hybrid circuit" is used herein as a generic term. A pair of tuning stubs 86 are provided in the section 84 of strip transmission line to reflect a portion of the delayed output signal back to the oscillator 80 as a locking signal. As previously discussed, the parameters of the coaxial line 82 and tuning stubs 86, and the length of strip transmission line between the oscillator 80 and the tuning stubs 86 are selected so that the reflected signal arriving at the oscillator 80 is close to $n\pi$ electrical radians out of phase with the oscillations therein, $n$ being an odd integer. Expressed in another way, the above parameters are selected so that the reflected signal is delayed for a period of time close to $$\frac{n}{2}T$$

where T is the period at the parametric oscillating frequency and $n$ is an odd integer. The oscillator 80 thus "sees" a locking signal which appears to be close to 180° out of phase with the parametric oscillations.

The output from the other parametric oscillator 80' is transmitted over a section 56' of strip transmission line to a second input arm 90 of the hybrid circuit 89. The length of section 56' and the length of section 84 between the tuning stubs 86 and the first input arm 88 of the hybrid circuit are adjusted so that inputs arriving at the hybrid circuit from the oscillators 80, 80' are either in phase or 180° out of phase with each other. The parametric oscillator 80' serves as a reference oscillator.

The hybrid circuit 89 has a third arm 92 which is terminated in a matched absorptive termination 94, such as is known in the art, and which may be a thin, flat piece of dielectric material coated on the side adjacent to the terminated arm 92 with absorptive material, such as graphite. The termination 94 may have a tapered portion 94*a* which is laid over the end part of the arm 92 and a rectangular portion 94*b* into the tapered portion 94*a* merges. The output from the hybrid circuit is derived from a fourth arm 96. The hybrid circuit 89 has a mean circumference 98 which is $3\lambda/2$, where $\lambda$ is the wavelength at the parametric oscillator frequency. Electrically, the first input arm 88 is $3\lambda/4$ from the terminated arm 92. The output arm 96 is $\lambda/4$ from the first input arm 88 and the second input arm 90, and the second input arm 90 is $\lambda/4$ from each of the terminated arm 92 and the output arm 96.

In operation, when the outputs of oscillators 80 and 80' arrive in phase at the input arms 88, 90, respectively, the outputs add in phase at the output arm 96 and a large output is obtained. At the same time, these outputs arrive 180° out of phase at the terminated arm 92 and cancel when the amplitudes are equal because of the properties of the hybrid circuit 89. The amplitudes of the signals arriving at the first and second input arms 88, 90 may be equalized by proper adjustment of the adjustable attenuators 100, 100'. For adjustment, the attenuators 100, 100' may be rotated on pivot pins 102, 102', respectively. The sector shape of the attenuators is illustrative only. When the outputs of oscillators 80, 80', arrive 180° out of phase at the first and second input arms 88, 90, respectively, no output is obtained at the output arm 96. The signals add in phase at the terminated arm 92, and the energy is absorbed in the termination 94, again because of the known properties of the hybrid circuit 89. It is thus seen that either a high output or no output is obtained from the hybrid circuit 89 depending upon the state of the parametric oscillator 80. The state of the parametric oscillator 80 may be switched by applying a voltage pulse 83 to the oscillator, or by one of the other methods previously described. This pulse causes the parametric oscillations in that oscillator to die out. When the pulse 83 is terminated, oscillations resume in the opposite phase because of the locking action of the signal reflected by the tuning stubs 86.

The circuit of FIGURE 6 may be operated as a bistable circuit at very high frequencies. The circuit may be operated singly as a single stage binary, or scale-of-two counter, or arranged with similar circuits in a fashion which will be apparent to those skilled in the art to form a multistage binary counter. The circuit of FIGURE 6, and also the oscillator of FIGURE 4, may be constructed of coaxial line or waveguide. Strip transmission line, however, is preferable because of its simplicity, reliability, low loss factor, and small size at high frequencies.

FIGURE 7 illustrates in block form another counter, or scaling circuit. The output of a pump 2 is passed through a filter 104 and applied to a parametric oscillator 106. The output of the parametric oscillator 106 is delayed in a device 108 and applied as one input to a comparator 110. A portion of the output of the delay device 108 is fed back as a locking signal to the parametric oscillator 106. A second input to the comparator 110 is provided by a reference oscillator 112, which may be a second parametric oscillator. The output phase of the parametric oscillator 106 may be switched by the application of a pulse 114 in the manner previously described. The relative phases of the output of the delay 108 with respect to the reference oscillator output may be sensed at the comparator output. When the inputs to the comparator 110 are of equal amplitude and in phase, a large output is derived from the comparator. However, when the inputs to the comparator are of equal amplitude but 180° out of phase, very little or no output is provided by the comparator 110. The comparator 112 may take the form of a hybrid circuit of the type shown in FIGURE 6 and described above. The reference oscillator 112 may be any suitable means for providing oscillations at the parametric oscillating frequency. For example, reference oscillator 112 may be another parametric oscillator driven by pump 2, or a suitable sub-harmonic generator driven by, or synchronized with, the pump 2 in the desired phase.

What is claimed is:

1. In combination, an oscillator having more than one distinct phase of oscillation at one frequency, means for applying pump signals to said oscillator to sustain oscillations at said one frequency, means for delaying a portion of the output of said oscillator for a selected period of time and for feeding back the delayed portion to said oscillator, and means for intermittently damping said oscillations for a time interval.

2. The combination set forth in claim 1 wherein said oscillator includes an element of variable reactance, said pump signals causing said reactance to vary about an average value.

3. The combination set forth in claim 1 wherein said pump signals have a frequency twice that of said one frequency, said delayed portion fed back to said oscillator being close to $n\pi$ radians out of phase with said oscillations, where $n$ is an odd integer.

4. In combination with a parametric oscillator capable of representing the two binary digits by two different phases of oscillation at one frequency, means for switching the phase of oscillations of said oscillator from one of said two phases to the other comprising means for delaying a portion of the output of said oscillator, means for feeding back to said oscillator said delayed portion, said delayed portion fed back to said oscillator being close to $n\pi$ radians out of phase with the oscillations of said oscillator, where $n$ is an odd integer, and means for momentarily causing the amplitude of said oscillations to decay below the amplitude of said delayed portion fed back.

5. In combination: a parametric oscillator having two distinct phases of parametric oscillations at one frequency; means for applying pump signals to said oscillator to sustain said oscillations at said one frequency; delay means coupled to receive and delay a portion of the output of said oscillator; means for feeding back to said oscillator a portion of the delayed output, the total delay of said portion fed back having a value close to $$\frac{n}{2}T$$

where $n$ is an odd integer and T is the period of said parametric oscillations; and means for intermittently interrupting said oscillations.

6. The combination set forth in claim 5 wherein said interrupting means is a voltage pulse applied to said oscillator.

7. The combination set forth in claim 5 wherein said interrupting means interrupts said pump signals.

8. In combination, a pair of parametric oscillators each having more than one distinct phase of parametric oscillations at the same one frequency, means for applying pump signals to said pair of oscillators to sustain oscillations at said one frequency, means for delaying in point of time a portion of the output of one of said pair of oscillators, means for feeding back the delayed portion of said output to said one of said pair, means for momentarily interrupting oscillations in said one of said pair, and a phase comparator coupled to receive the outputs of said pair of parametric oscillators.

9. The combination set forth in claim 8 wherein each of said pair of parametric oscillators has two distinct phases of parametric oscillation at the same one frequency.

10. The combination set forth in claim 9 wherein the total time delay of said delayed portion fed back to said one of said oscillators is such that the portion fed back is close to $n\pi$ radians out of phase with the parametric oscillations in said one oscillator, $n$ being an odd integer.

11. In combination, a parametric oscillator having more than one distinct phase of parametric oscillation at one frequency, means for applying pump signals to said parametric oscillator to sustain parametric oscillations at said one frequency, means for delaying a portion of the output of said parametric oscillator and for feeding back the delayed portion to said parametric oscillator, means for momentarily causing the amplitude of said oscillations to decay below the amplitude of said delayed portion fed back, a second oscillator oscillating at said one frequency, and a phase comparator connected to receive the outputs from said parametric oscillator and said second oscillator.

12. The combination set forth in claim 11 wherein the total delay of said delayed portion fed back is close to $$\frac{n}{2}T$$

where T is the period of said parametric oscillations, and $n$ is an odd integer.

References Cited in the file of this patent

FOREIGN PATENTS 778,883 Great Britain ---------- July 10, 1957

OTHER REFERENCES

Waveforms, by Chance et al., published by McGraw-Hill, 1949, pp. 238–253.